Figure 1:
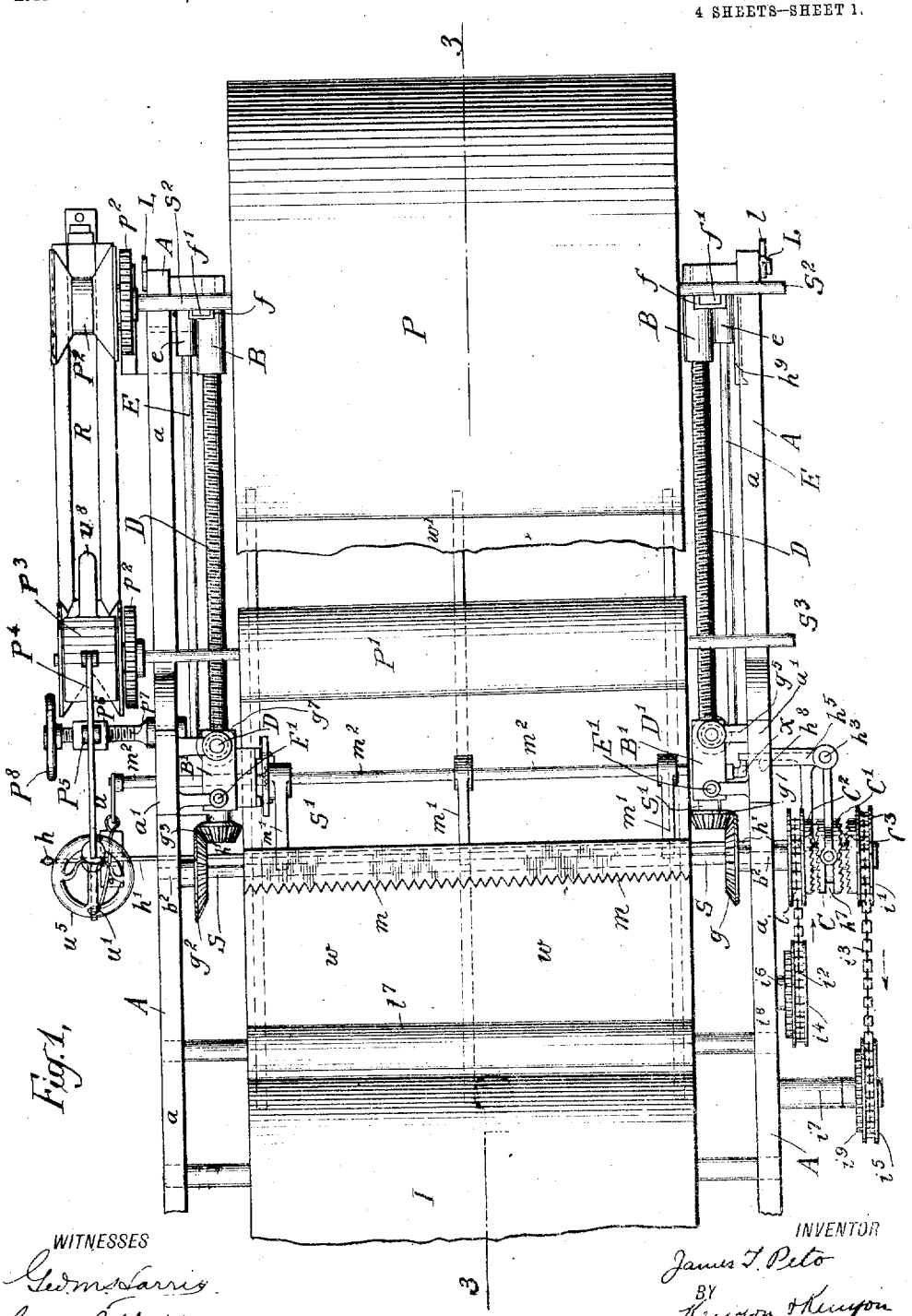

J. T. PETO.

ROLL RENEWING ATTACHMENT FOR PRINTING PRESSES.

APPLICATION FILED DEC. 2, 1913.

Reissued Jan. 6, 1914.

13,671.

4 SHEETS—SHEET 1.

WITNESSES

Geo. M. Harris

George Schlatt

INVENTOR

James T. Peto

BY

Kenyon & Kenyon

ATTORNEYS

J. T. PETO.

ROLL RENEWING ATTACHMENT FOR PRINTING PRESSES.

APPLICATION FILED DEC. 2, 1913.

Reissued Jan. 6, 1914.

13,671.

4 SHEETS—SHEET 2.

WITNESSES

George Harris

George Schlatt

INVENTOR

James T. Peto

BY

Kenyon & Kenyon

ATTORNEYS

J. T. PETO.

ROLL RENEWING ATTACHMENT FOR PRINTING PRESSES.

APPLICATION FILED DEC. 2, 1913.

Reissued Jan. 6, 1914. 13,671.

4 SHEETS—SHEET 3.

WITNESSES

Geo. H. Harris

George Schlatt

INVENTOR

James T. Peto

BY

Kenyon & Kenyon

ATTORNEYS

J. T. PETO.
ROLL RENEWING ATTACHMENT FOR PRINTING PRESSES.
APPLICATION FILED DEC. 2, 1913.
Reissued Jan. 6, 1914.
13,671
4 SHEETS—SHEET 4.
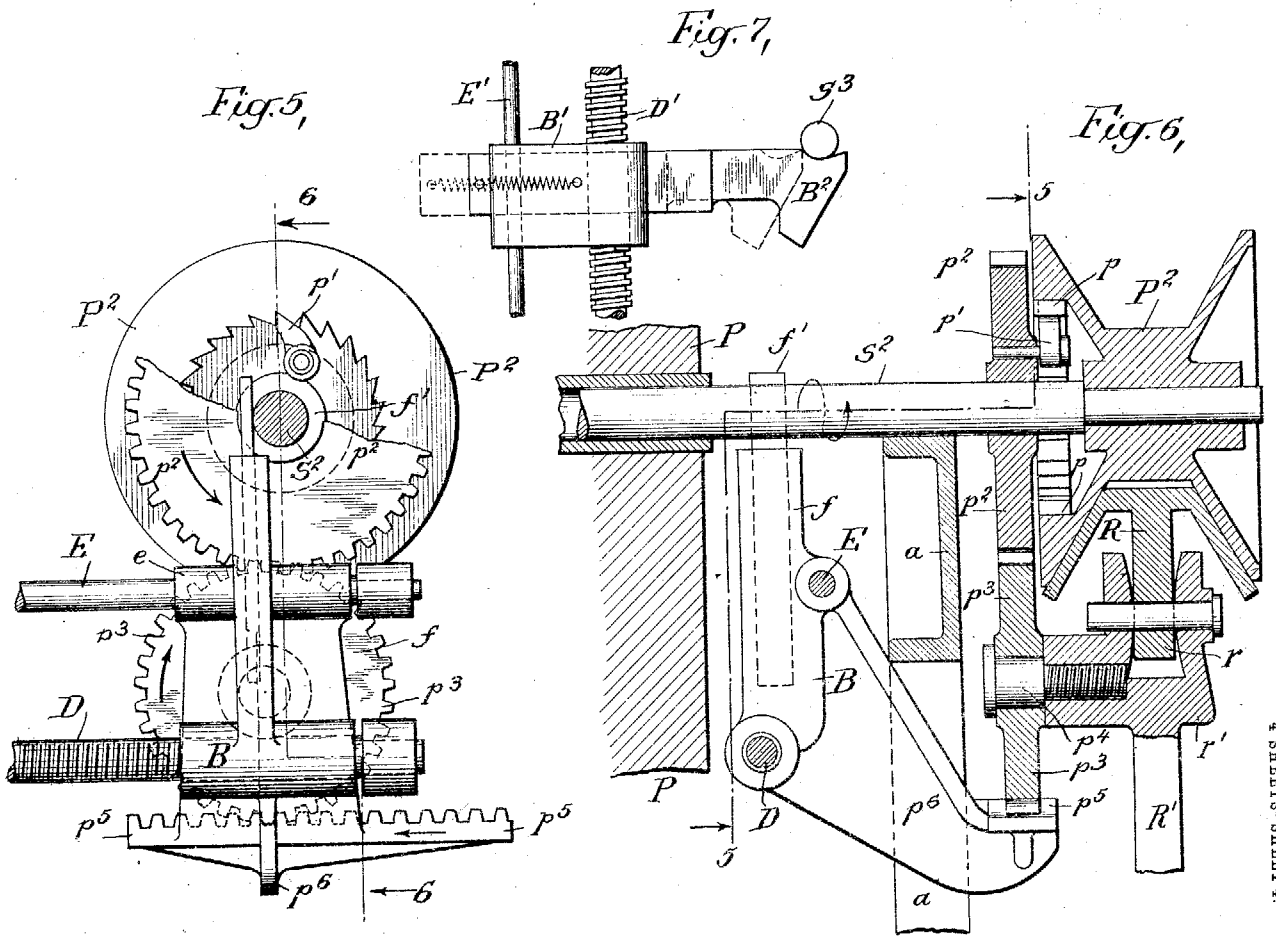
WITNESSES
Geo. M. Carrs
George Schlatt
INVENTOR
James T. Peto
BY
Kenyon & Kenyon
ATTORNEYS

UNITED STATES PATENT OFFICE.

JAMES T. PETO, OF PATERSON, NEW JERSEY, ASSIGNOR TO SAMUEL THOMAS WALKUP, OF NEW YORK, N. Y.

ROLL-RENEWING ATTACHMENT FOR PRINTING-PRESSES.

13,671. Specification of Reissued Letters Patent. Reissued Jan. 6, 1914.

Original No. 940,272, dated November 16, 1909, Serial No. 257,691. Application for reissue filed December 2, 1913. Serial No. 804,323.

*To all whom it may concern:*

Be it known that I, JAMES T. PETO, a citizen of the United States, residing at Paterson, county of Passaic, and State of New Jersey, formerly a resident of New York, in the borough of Brooklyn, State of New York, have invented certain new and useful Improvements in Roll-Renewing Attachments for Printing-Presses, of which the following is a specification.

This invention relates to an improved roll-renewing attachment for printing presses, by which a new roll of paper can be supplied to the press in place of the spent roll without stopping the press, by placing the new roll in position, then splicing the paper from the new roll to the web of the spent roll and then running in the new roll while moving simultaneously the spent roll out of the way, and repeating this operation as many times as may be required, so as to permit the continuous and uninterrupted running of the press and save the time heretofore lost in stopping the press in placing the new roll in operative position therein.

For this purpose, the invention consists of a roll-renewing attachment for printing presses which comprises two horizontal screw-spindles, two vertical screw-spindles, roll supporting-blocks reciprocated simultaneously by said screw-spindles, a power-shaft driven from the press, a clutch-mechanism adapted to move said shaft in one or the opposite direction, means for transmitting motion in one or the other direction to the horizontal and vertical screw-spindles, and means for throwing the clutch-mechanism out of mesh with the power-shaft when the roll-spindles have arrived at the ends of their motions.

The invention consists further in the arrangement of a system of web-carrying tapes located below the paper-roll and adapted to convey the paper to the press and permit the splicing of the web of the new roll on to the web of the spent roll.

The invention consists further in the arrangement of a serrated cutting-blade and mechanism for oscillating the same at the proper time so as to cut off the web of the spent roll after the splicing of its web with the web of the new roll has been accomplished.

The invention consists further of the combination of a V-shaped guide-rail supported alongside of the roll-guiding frame of the attachment with a brake-pulley on the spindle of the new roll and intermediate mechanism between the spindle of the new roll and the brake-pulley for starting and controlling the forward motion of the new roll; and the invention consists lastly of certain additional details of construction and combination of parts which will be fully described hereinafter, and finally pointed out in the claims.

Figures 2, 3:
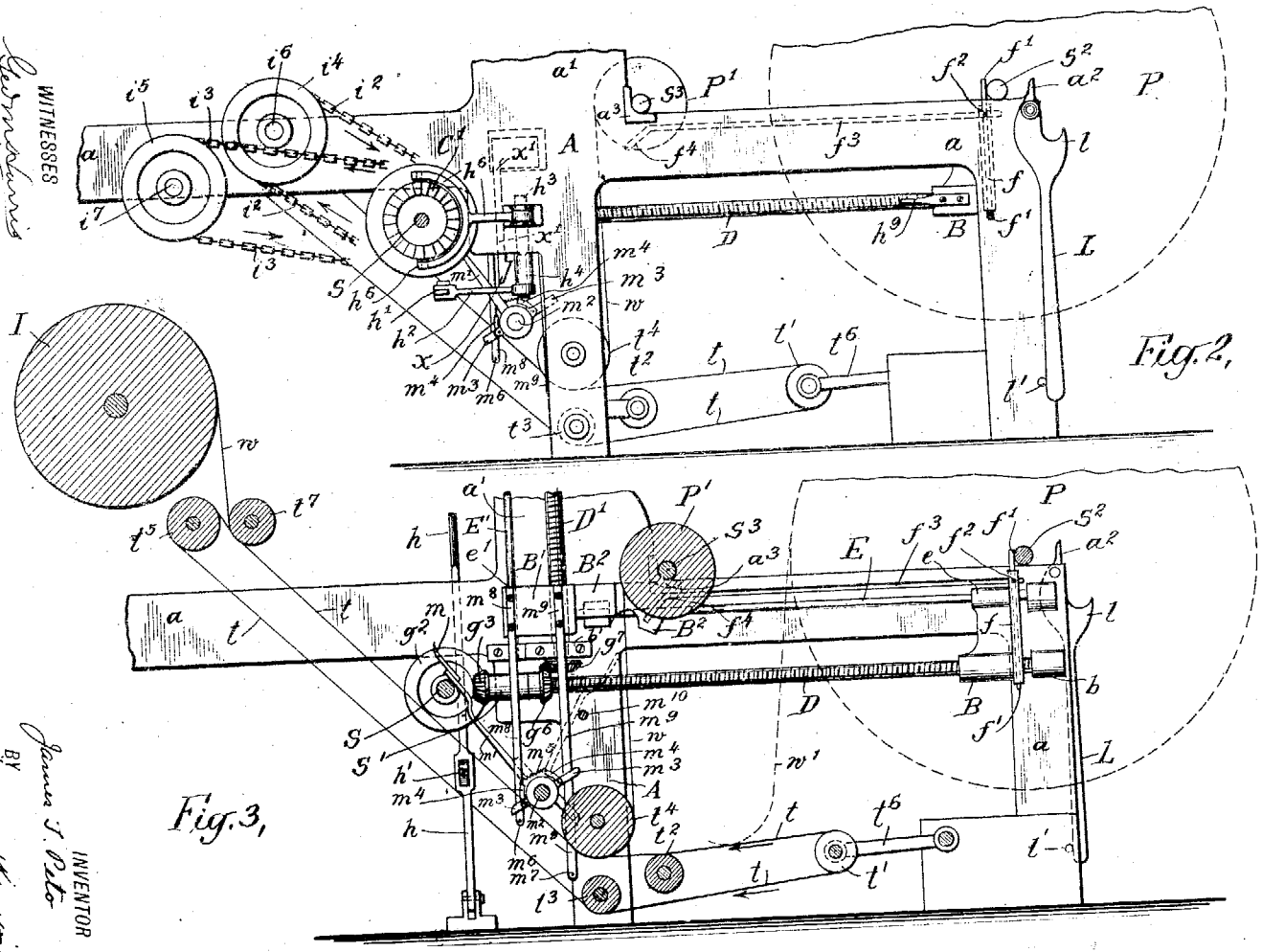
Figure 4:
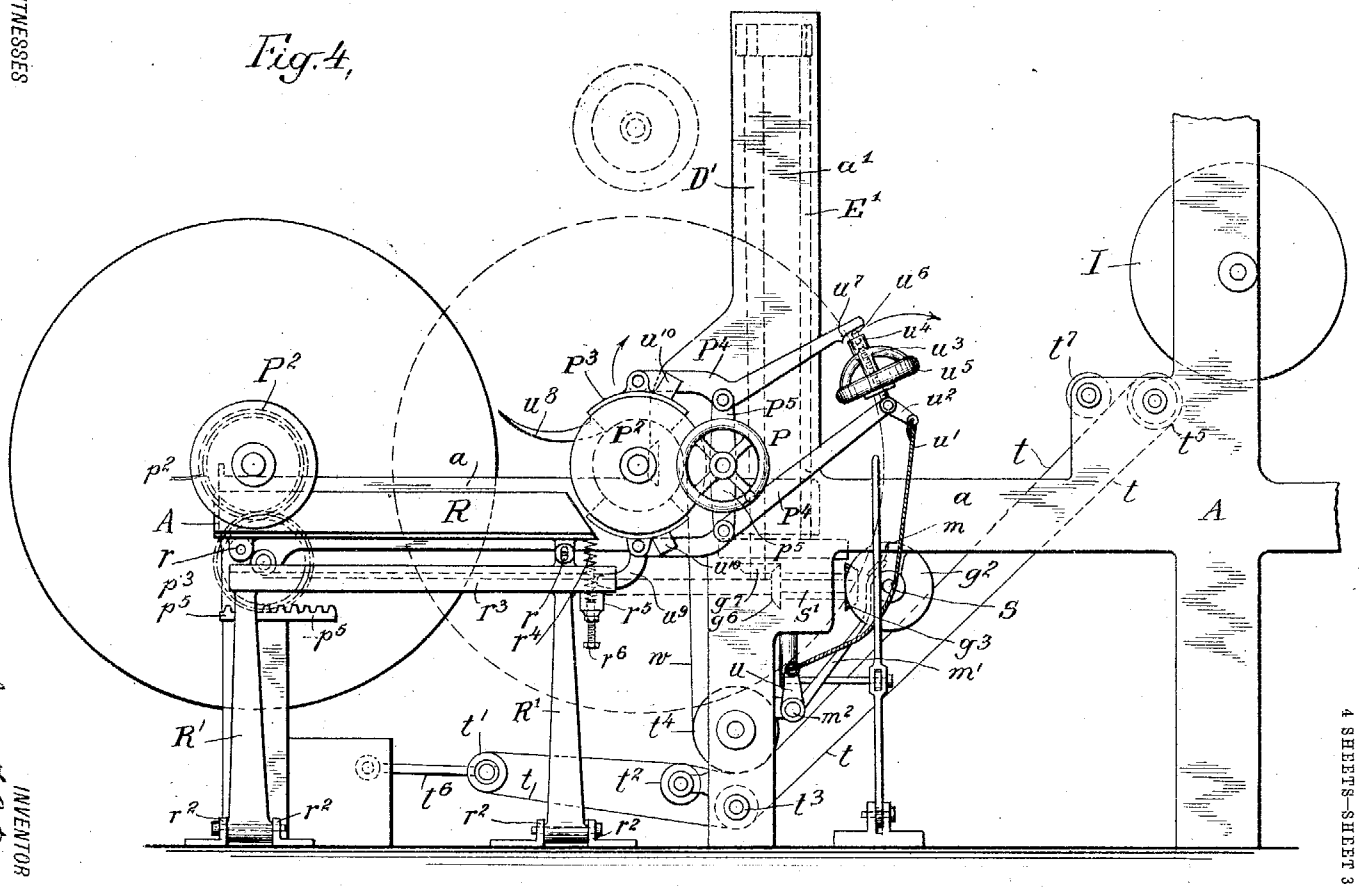

In the accompanying drawings, Figure 1 represents a plan-view of my improved roll-renewing attachment for printing presses, Fig. 2 is a side-elevation of the lower part of one side of the attachment, the upper part being broken away. Fig. 3 is a vertical longitudinal section on line 3—3, Fig. 1. Fig. 4 is a side-elevation of the attachment showing the opposite side of the same, and Figs. 5 and 6 are, respectively, a detail vertical section on line 5—5, Fig. 6, and line 6—6, Fig. 5, showing the improved gear for starting and controlling the motion of the new roll. Fig. 7 is a detail of one of the spindle lifting brackets, with their tension springs.

Similar letters of reference indicate corresponding parts in the different figures of the drawing.

Referring to the drawings, A represents the supporting main-frame of my improved roll-renewing attachment for printing presses, which is connected at one end with the supporting-frame of the printing press with which the attachment is to be used. The frame A is composed of two upright side-frames $a$, which are connected by transverse brace-rods, and which are provided with upright extensions $a^1$ intermediately between their ends. In suitable bearings $b$, attached to the side-frames $a$, are supported two horizontal screw-spindles D, one on each side-frame, and in bearings $b^1$ on the upright extensions $a^1$ a pair of vertical screw-spindles $D^1$, one on each extension, as shown clearly in Figs. 1 and 3. The thread of one screw-spindle of each pair of screw-spindles is arranged in opposite direction to that of the other screw-spindle, so that when motion is transmitted from a transverse power-shaft S, which is supported in suitable bearings $b^2$ of the side-frames $a$, by intermediate transmitting bevel-gears $g$, $g^1$ and $g^2$, $g^3$ to the horizontal pair of screw-spindles D, and by bevel-gears $g^4$, $g^5$ and $g^6$, $g^7$ to the vertical pair of screw-spindles $D^1$, blocks B, $B^1$, which are placed on the screw-spindles D, $D^1$, are moved either in one or the opposite direction. Parallel with the horizontal screw-spindles D and the vertical screw-spindles $D^1$ are supported on the side-frames $a$ and extension-frames $a^1$ horizontal and vertical guide-rods E and $E^1$, along which the reciprocating-blocks B and $B^1$ are guided by sleeves $e$ and $e^1$. The blocks B on the horizontal screw-spindles D are each provided with a vertical guide-socket $f$, in which a vertical bar $f^1$ is guided, which bars serve for the purpose of preventing the spindle $S^2$ of the new roll of paper P, that is placed in position on the outermost ends of the side-frames $a$, from rolling forward toward its operative position faster than permitted by the motion of the blocks B. The bars $f^1$ are each provided with a pin $f^2$ which projects into a horizontal guide-groove $f^3$ in each side-frame $a$, said groove being arranged parallel with the screw-spindle D and guide-rod E and provided at the end adjacent to the seats $a^3$ located at the connection of the horizontal side-frames $a$ and upright extensions $a^1$ with an incline $f^4$, so that the vertical bars $f^1$ are lowered for permitting the spindle of the new roll to pass over the bars $f^1$ and take its place on the seats $a^3$ when the new roll has been moved forward into its operative position.

The blocks $B^1$ that are reciprocated by the vertical screw-spindles $D^1$ are provided with horizontally-guided brackets $B^2$ that extend at right-angles to the blocks in a direction parallel with the side-frames $a$ toward the rear-end of the supporting-frame A, said brackets being provided at their outer ends with inclined faces and in their upper surfaces with concave seats so as to form bearings for the spindle of the spent roll when the same is to be moved upwardly on the blocks on the vertical spindles $D^1$. The side-frames $a$ are provided at their rear-ends with lifting-levers L having each an upwardly-projecting lug $a^2$, which serve to prevent the new roll of paper from rolling off the side-frames $a$ after it has been placed in position thereon. Whenever a new roll is to be placed into operative position in place of the spent roll, power is transmitted from the shaft of the impression-cylinder of the press, or from any other shaft of the same, by intermediate motion-transmitting mechanism to the shaft S, and from the same by the intermediate bevel-gears to the horizontal and vertical screw-spindles D, $D^1$, so as to produce the lifting of the spent roll $P^1$ in a vertical direction and the gradual forward motion of the new roll P into the position before occupied by the spent roll, in connection with the blocks $B^1$ and brackets $B^2$ and the blocks B. The mechanism so far described for lifting the spent roll and moving the new roll into its place has not been invented by me, and I hereby distinctly disclaim the same.

*The double clutch-mechanism.*—For the purpose of transmitting in one or the opposite direction to the shaft S and for automatically interrupting the motion of the same, a double clutch-mechanism C is arranged at one end of the shaft S, as shown in Figs. 1 and 2. This clutch-mechanism consists of a movable double clutch-member $C^1$ which is splined to the shaft S and located intermediately between two clutch-members $C^2$, $C^3$, which are placed loosely on the shaft S. The clutch-members $C^2$, $C^3$ are provided with sprocket-wheels $i$ and $i^1$ which are connected by sprocket-chains $i^2$ and $i^3$ with sprocket-wheels $i^4$ and $i^5$ turning loosely on stud-shafts $i^6$ and $i^7$, which are supported on the adjacent side-frames $a$, as shown in Fig. 1. The sprocket-wheels $i^4$ and $i^5$ are provided, respectively, with gear-wheels $i^8$, $i^9$ attached thereto, to which continuous rotary motion is imparted from the shaft of the impression-cylinder or other convenient shaft of the printing press. As soon as a new roll is to be moved into operative position, the movable double clutch-member $C^1$ is shifted by operating a handle-lever $h$ at the opposite side of the main-frame A and a shifting-mechanism into mesh with the clutch-member $C^2$, so that forward motion is imparted by the horizontal screw-spindles D to the new roll and simultaneously upward motion to the spent roll $P^1$ until the former takes the place of the latter. The shifting-mechanism is composed of a connecting-rod $h^1$ which is pivoted to the handle-lever $h$ and extended transversely across the main-frame A to a crank-arm $h^2$ which is located below the clutch-mechanism C. The crank-arm $h^2$ is keyed to the lower end of an upright rock-shaft $h^3$ which is in a sleeve-shaped bearing $h^4$ supported in brackets $h^5$. To the upper end of the rock-shaft $h^3$ is attached a forked lever $h^6$ which engages a circumferential groove $h^7$ of the double clutch-member $C^1$ so as to produce the shifting of the same into mesh with the clutch-members $C^2$ or $C^3$. A second crank-arm $h^8$ extends at right-angles to the crank-arm $h^2$ inwardly into the side-frame $a$, as shown in Fig. 1, and into the path of a horizontal push-piece $h^9$, which is attached to the traversing block B of the adjacent screw-spindle D, so that when the block arrives at its inward position together with the new roll of paper, the crank-arm $h^8$ is pushed sidewise and thereby the movable clutch-member $C^1$ shifted by the forked lever $h^6$ out of mesh with the clutch-member $C^2$ and returned into its median position between the clutch-members $C^2$, $C^3$. The rotary motion of the shaft S is thereby instantly interrupted and the motion of the screw-spindles D, $D^1$, blocks B, $B^1$ and the rolls P, $P^1$ arrested. The spent roll $P^1$ is then removed from its brackets $B^2$. The blocks $B^1$ and their brackets $B^2$ have then to be returned from their raised position into a position below the spindle of the new roll, and the blocks B from their inner-most position into their outermost position, so that the brackets $B^2$ are ready for receiving the spindle $S^3$ of the next spent roll and the blocks B and their retaining-bars $f^1$ the spindle of the new roll. For this purpose the handle-lever $h$ and the intermediate crank-mechanism are again operated and the double clutch-member $C^1$ shifted and placed in mesh with the clutch-member $C^3$. Rotary motion is thereby immediately transmitted to the shaft S, but in a reverse direction from its former motion, so that the motion of the screw-spindles is likewise reversed and the blocks B moved in outward, and the blocks $B^1$ with their brackets $B^2$ in downward direction. When the inclined faces of the brackets arrive in contact with the spindle $S^3$ of the roll $P^1$, they are slowly pressed back against the tension of their springs whereby the brackets can pass the spindle $S^3$ and assume a position below the same, as shown in Fig. 3, with their concave seats below the spindle $S^3$, so that it is ready to be engaged and lifted by the brackets $B^2$ on their next upward motion. By the descending motion of the brackets $B^2$, a wedge-piece $x$, which is attached by a vertical arm $x^1$ to the block $B^1$ next adjacent to the clutch-mechanism, engages by its tapering face the inner end of the crank-arm $h^8$ and pushes it sidewise, but in a direction opposite to its former motion, so that the forked clutch-lever $h^6$ moves the clutch-member $C^1$ out of mesh with the clutch-member $C^3$ and interrupts thereby again the motion of the shaft S and of the screw-spindles D, $D^1$ and the blocks B, $B^1$. It appears thus that the starting of the motion of the shaft S is accomplished by the setting of the clutch-mechanism by the attendant who operates the hand-lever $h$ and the intermediate crank-mechanism, while the stopping of the shaft is automatically accomplished by the action of the push-piece $h^9$ and the wedge-piece $x$.

The roll-lifting levers L are pivoted to the upper corners of the side-frames $a$ and provided with a hook-shaped projection $l$ below their pivots. The spindle of the new roll is placed into juxtaposition to the levers L and then lifted onto the projections of the same. The lower ends of the levers L abut against stop-pins $l^1$, the levers being held by gravity in position alongside of the side-frames $a$ when not in use. When the spindle of the new roll is placed in position on the hook-shaped projections $l$, both levers L are taken hold of at their lower ends and turned slowly on their pivots until the spindle of the roll moves by gravity over the lugs $a^2$ at the ends of the levers L onto the corners of the side-frames $a$ and against the projecting ends of the retaining-bars $f^1$. The levers are then lowered again in the position shown in Figs. 2 and 3, and held in this position by gravity, the projecting lugs $a^2$ preventing the roll from rolling off the side-frames $a$.

*The web-feeding tapes.*—At the lower part of the supporting-frame of the attachment, below the roll of paper when the same is in operative position for feeding the web to the press, is arranged a set of endless web-guiding tapes $t$ which are stretched by suitable guide and tension-rolls $t^1$, $t^2$, $t^3$, $t^4$, and moved by a driving-roll $t^5$, to which rotary motion is imparted at the same speed as that required by the paper in the press. The guide-roll $t^1$ is connected by pivot-links $t^6$ with the lower part of the frame A. The guide-rolls $t^3$, $t^4$, serve for guiding the tapes in an upward direction toward the impression-cylinder I of the press, while the guide-roll $t^7$ conducts the web $w$ from the upper ends of the tapes to the impression-cylinder. The tapes are intended not only to feed the web $w$ from the roll in a reliable and uniform manner to the press, but also for the purpose of permitting the convenient and reliable splicing of the web $w^1$ of the new roll to the web $w$ of the spent roll as the new roll is gradually moved forward into operative position and the latter in upward position out of the way of the new roll. For the purpose of making a splice the end of the web of the new roll is cut off transversely at right-angles to its central line, and a coating of paste applied to the upper surface of the same a short distance back of the end, and then the end is taken hold of by the hands of the operators, one on either side of the apparatus, and inserted under the roller $t^4$. The new roll is held stationary and its end only permitted to pass under the roll $t^4$ a short distance sufficient to pull the web taut, care being taken that the line of paste does not come in contact with the old web. The parts remain in this condition until the web on the old roll has about expired, when the clutch is thrown to permit the new roll to move forward over the side-frames. As the new roll thus moves forward, at the same time being given a momentary positive rotary movement to unwind its web, the new web is drawn between the roller $t^4$ and the tapes so that the pasted portion passes between them, thereby splicing the end of the new web to the old web.

*The web-cutting blade.*—As soon as the proper splicing of the web of the new roll to the web of the spent roll is completed, the web of the spent roll has to be cut off so as to permit the spent roll to be raised out of the way, and also permit the forward feeding of the web of the new roll by the tapes to the impression-cylinder I. This is accomplished by means of an oscillating serrated cutting-blade $m$ which is supported on arms $m^1$ that are mounted on a transverse shaft $m^2$ which turns in bearings of the side-frames $a$. On the shaft $m^2$, below the block $B^1$ on the opposite side of the frame A, are arranged on the hub of the next adjacent arm $m^1$, pivoted fingers $m^3$ which extend in diametrical opposite direction from the hub and which are provided with arc-shaped stop-pieces $m^4$ that are connected by a helical spring $m^5$. The fingers $m^3$ are engaged by projecting pins $m^6$ and $m^7$ which are arranged at the lower ends of parallel rods $m^8$ and $m^9$, of different lengths, that are attached at their upper ends to the block $B^1$ and moved up and down with the same. When the block $B^1$ moves in downward direction and arrives at the lowermost position, the projecting pins $m^6$ and $m^7$ pass over the pivoted fingers $m^3$, which latter yield sufficiently for this purpose, while during the upward motion of the block $B^1$, simultaneously with the lifting of the spent roll, the pin $m^6$ on the shorter rod $m^8$ engages one of the fingers $m^3$ and imparts thereby an oscillating motion to the shaft $m^2$ and the serrated cutting-blade $m$ so that the teeth of the same pierce the web of the spent roll and produce by the tension on the web the tearing off and complete separation of the web from that portion of the web still remaining on the roll. The oscillating motion of the serrated cutting-blade is limited by the shaft S at one side and a stop-pin $m^{10}$ at the other side, as shown in Fig. 3. While the web of the spent roll is cut off, the block $B^1$ continues its motion until the pin $m^7$ on the longer rod $m^9$ engages the diametrically opposite finger $m^3$ and imparts thereby an oscillating return motion to the cutting-blade, so that the same is returned into its former position, shown in full lines in Fig. 3, until again oscillated for cutting the web of the next roll and so on. The teeth of the cutting-blade $m$ are arranged at the slight angle to the blade proper so that they pierce in a reliable manner the web of the spent roll and produce thereby the cutting off of the same immediately after the web of the new roll has been spliced to the web of the spent roll.

*The guide and brake-mechanism for the new roll.*—The spindles which are inserted into the cores of the rolls of paper are provided at one end with a brake-pulley $P^2$ which moves over a guide and brake-rail R, of inverted V-shape, said guide and brake-rail being located parallel with the side-frames $a$ at that side of the main-frame A on which the well-known brake-mechanism for the rolls is arranged. The guide and brake-rail R is supported by center-lugs $r$ on the forked upper ends $r^1$ of upright standards $R^1$, the lower ends of which are pivoted to ears $r^2$, attached to the bedplate of the attachment or to the adjacent side-frame $a$. The end of the guide and brake-rail R which first receives the new roll of paper, is placed at a slightly lower level than its opposite end, so that the new roll turns freely while being supported on the side-frames $a$ and moves forward for two or three inches, although it is guided laterally; then it comes in vertical contact with the guide and brake-rail, and rolls up the slight incline, until the entire weight of that end of the roll of paper is gradually taken off the side-frames $a$ and transferred to the guide and brake-rail. The guide and brake-rail is designed to accomplish the double purpose of guiding the new roll of paper and of keeping a proper tension on the same while it is moved forward into operative position, its rear-end being low enough to escape any weight of the new roll of paper, which at that point rests upon the side-frames $a$, but when the roll is moved in toward the press for a short distance it comes into contact with the guide and brake-rail, the inner end of which is slightly higher than the outer end, thus forming an inclined track over which the brake-pulley of the new roll of paper has to move. As the diameter of the brake-pulley is large in comparison to the roll-spindle and as the roll can move forward only as fast as the guide-blocks B travel, a considerable slip takes place which produces friction and tension on the web of the new roll of paper as the latter is moved forward to its operative position.

The upper ends of the standards $R^1$ are connected by a longitudinal rail $r^3$ which is located below the guide and brake-rail R, as shown in Fig. 4. The center-lug $r$ at the end of the guide and brake-rail R next adjacent to the brake-mechanism is slotted and cushioned by a helical spring $r^4$, which is interposed between the underside of the guide and brake-rail R and a socket $r^5$ having a set-screw $r^6$ that is arranged at the underside of the longitudinal rail $r^3$, so that the end of the guide and brake-rail R can "give" slightly under the weight of the new roll as the same is moved forward into the angle between the horizontal portions of the side-frames and the vertical extensions of the same. The pivot-connection of the standards $R^1$ permits the lateral oscillation of the guide and brake-rail R relatively to the stationary side-frame $a$ adjacent thereto.

The brake-pulley $P^2$ is provided at its inner side adjacent to the roll of paper with an internal ratchet-gear $p$ which is engaged by a spring-actuated pawl $p^1$ which is pivoted to a gear-wheel $p^2$ that is placed loosely on the roll-spindle. A pinion $p^3$ is mounted loosely on a stud-shaft $p^4$ at the upper end of the standard $R^1$, below the ingoing end of the guide and brake-rail R, and placed in mesh with the gear-wheel $p^2$ above and with a horizontal rack $p^5$ below, said rack being supported on a bracket $p^6$ that is attached to the block B adjacent to the guide and brake-rail R and extended at right-angles to said block through the side-frame $a$, as shown in Figs. 5 and 6. The rack $p^5$ is made of sufficient width to provide for the lateral oscillations of the guide and brake-rail R without being disengaged from the pinion $p^3$. When forward motion is imparted to the block B by its horizontal screw-spindle D, the rack $p^5$ transmits by pinion $p^3$, gear-wheel $p^2$, pawl $p^1$ and internal ratchet-gear $p$, rotary motion to the brake-pulley $P^2$ and the spindle of the roll, so as to start the same while its spindle is held back by the retaining-bars $f^1$ of the blocks B. The starting motion of the roll is thus accomplished in an easy and steady manner, so as to permit the free forward motion of the coated end of the web as it is fed by the tapes and roll $t^4$ for the splicing operation until the rack $p^5$ has passed out of mesh with the motion-transmitting pinion $p^3$, when the rotary motion of the roll is continued by the tension exerted on the same by the spliced web as it is drawn in by the press and the slight momentum imparted to it by the starting-mechanism. While the new roll moves forward over the side-frames $a$ and the brake-pulley $P^2$ over the guide and brake-rail R, the spindle of the spent roll is lifted out of the way of the new roll by the brackets $B^2$ and blocks $B^1$ operated by the vertical spindles $D^1$. When the spindle of the new roll arrives in the position before occupied by the spindle of the spent roll, the rotary motion of the screw-spindles is automatically interrupted by the double clutch-mechanism before described and the paper fed to the press from the new roll in the same manner as the web of the roll which was before in this position, as the splicing of the web of the new roll to the web of the spent roll has been accomplished in the meantime.

The brake-mechanism consists of brake-shoes $P^3$ which are pivoted to the ends of brake-levers $P^4$ and applied to the upper and lower parts of the brake-pulley $P^2$, as shown in Fig. 4. The ends of the brake-levers $P^4$ are locked so as to hold the brake-shoes on the brake-pulley $P^2$ by an adjustable locking-device, which is connected with the shaft of the cutting-blade and actuated by the same.

Before the new roll can take the place of the spent roll, it is necessary to remove the brake-shoes $P^3$ from the brake-pulley $P^2$ on the spindle of the spent roll. This is accomplished by means of a crank-arm $u$, which is attached to the opposite end of the shaft $m^2$ and connected by a flexible rope or chain $u^1$ with an elbow-lever $u^2$ that is fulcrumed to the outer end of the lever $P^4$ of the lower brake-shoe $P^3$. To the threaded upper arm $u^3$ of the elbow-lever $u^2$ is applied an interiorly-threaded sleeve $u^4$, which is operated by means of a hand-wheel $u^5$, said sleeve being provided with a point $u^6$ at its upper end for engaging the outer end of the lever $P^4$ of the upper brake-shoe $P^3$. This lever $P^4$ is provided near its outer end and at its underside with a projection $u^7$ so that the point $u^6$ cannot pass beyond the projection $u^7$. The upper brake-shoe $P^3$ is provided at its opposite end with a curved arm $u^8$ that is engaged by the brake-pulley of the spent roll for moving the upper brake-shoe and its lever out of the way during the upward motion of the spent roll. The levers $P^4$ of the upper and lower brake-shoes $P^3$ are fulcrumed to the ends of an upright supporting-piece $P^5$ which is provided with an interiorly-threaded hub $P^6$ that is engaged by a threaded stud-shaft $P^7$, as shown in Figs. 1 and 4. The stud-shaft $P^7$ is supported in the side-frame $a$ and provided with a hand-wheel $P^8$ at its outer end, so that by turning the stud-shaft in one or the opposite direction, the upright supporting-piece $P^5$ will be moved slightly outwardly or inwardly into alinement with the longitudinal axis of the guide and brake-rail R and the brake-pulley $P^2$ so as to produce the lateral shifting of the new roll on the side-frames to bring the web into proper relative position to the impression-cylinder.

The lower brake-shoe $P^3$ is provided with a curved arm $u^9$ which engages the forked upper end of the connecting-rail $r^3$ of the inner standard $R^1$ so that the rail $r^3$ as well as the guide and brake-rail R follow the lateral adjustment of the supporting-piece $P^5$ and hold the brake-mechanism in alinement with the guide and brake-rail and adjust the brake-pulley and the roll of paper laterally, as required. By the hinged and laterally-oscillating standards of the guide and brake-rail R the new roll of paper is shifted and its brake-pulley placed in alinement with the brake-shoes by the adjustment of the brake-levers $P^4$ described, so as to fully control the position of the new roll relatively to the impression-cylinder and of the brake-pulley $P^2$ to the guide and brake-rail R and the brake-mechanism. On the brake-shoes $P^3$ are arranged lugs $u^{10}$, which project over the brake-levers $P^4$ and serve to hold them steadily thereon during their release from the brake-pulley of the spent roll and their return into engagement with the brake-pulley of the new roll.

As soon as the cutting-blade is oscillated for cutting off the web of the spent roll and the elbow-lever $u^2$, $u^3$ dropped out of engagement with the end of the upper brake-lever $P^4$ in the direction of the arrow, shown in Fig. 4, the elbow-lever is supported in tilted position at the outer end of the lower brake-lever $P^4$. The upper brake-lever $P^4$ and its brake-shoe $P^3$ can then be readily moved out of the way of the brake-pulley on the spindle of the spent roll during the upward motion of the latter until the brake-lever assumes a vertical position by the contact of its brake-shoe with the brake-pulley of the spent roll.

The blocks $B^1$ and brackets $B^2$ are moved on the vertical screw-spindles $D^1$ for a sufficient distance below the spindle of the spent roll that the release of the brake-mechanism from the brake-pulley of the spent roll is accomplished before the brackets reëngage the spindle of the spent roll for moving it out of the way. As will be seen by the dotted line construction in Fig. 3, the brackets $B^2$ normally rest a short distance below spindle $S^3$. As during the upward motion of the spent roll, the new roll with its brake-pulley is moved into the former position of the spent roll, the upper brake-shoe drops by gravity on to the brake-pulley of the new roll, as soon as its curved arm $u^6$ is released from the brake-pulley of the spent roll; the attendant then returns the locking elbow-lever $u^2$, $u^3$ of the brake-levers $P^4$ into position so as to support the upper brake-lever $P^4$ and apply both brake-shoes to the brake-pulley for exerting the required brake-action on the spindle of the roll and hold the same in position for permitting the new roll of paper to turn freely thereon while its web is fed to the printing press. The shifting of the new roll of paper by the proper alinement of the brake-pulley with the guide and brake-rail and by the adjustment of the brake-levers, permits the free forward motion of the paper-roll into operative position, while the action of the brake-shoes on the brake-pulley of the spindle as soon as the brake-levers are relocked in position, permits the turning of the spindle and roll on the same against the friction of the brake-shoes for feeding the web to the printing press. The brake-shoes, the brake-levers and the locking-device for the latter have been used in web-printing presses before and form no part of my invention.

*Operation:*—When the printing press is to be started, it is necessary to return the blocks B and $B^1$ on the horizontal and vertical screw-springs D and $D^1$, one into their outermost position on the horizontal screw-spindles and the other in position at the lower ends of the vertical screw-spindles. For this purpose the hand-lever $h$ is moved by the attendant for a sufficient distance to bring the movable clutch-member $C^1$ into engagement with the clutch-member $C^3$, which is rotated by power transmitted from the press. By placing the movable clutch-member $C^1$ into mesh with the rotary clutch-member $C^3$, motion is transmitted to the shaft S, and by the intermediate gear-wheels to both the horizontal and vertical screw-spindles D, $D^1$ and to the blocks B, $B^1$ supported by the same. The blocks B on the horizontal screw-spindles are thereby moved to the outer ends of the same, while the blocks $B^1$ on the vertical spindles are moved to the lower ends of the same, until their brackets $B^2$ are located slightly below the angle-pieces at the connection of the horizontal portions and vertical extensions of the side-frames. The new roll is then placed in position on the outer ends of the side-frames by the levers L. At the end of the downward motion of the blocks $B^1$ the wedge-piece $x$ engages the crank-lever $h^8$ by which the movable clutch-member $C^1$ is operated, so that the same is moved out of mesh with the clutch-member $C^3$, and the motion transmitted to the shaft S immediately interrupted, also the motion of the screw-spindles and the blocks B, $B^1$. The new roll being placed in position at the outer ends of the side-frames, its spindle rests against the projecting ends of retaining-bars $f^1$. The end of the web of the new roll is then cut straight across parallel to the axis of the roll and coated with the layer of paste and evenly inserted by hand into the bite between the tapes and roll $t^4$ as above described. All is now ready for effecting the splicing of the web of the new roll to the web of the spent roll. The press is then slowed down by the attendant until the web of the spent roll is run down as close to its core as desired. As soon as this point is reached, the hand-lever $h$ is moved in the opposite direction so as to cause the movable clutch-member $C^1$ to engage with the clutch-member $C^3$ and start thereby the motion of the shaft S, but in opposite direction to its former motion, whereby motion is imparted to the screw-spindles and to the blocks on the same so that the latter are moved in an opposite motion to their former motion. Simultaneously with the starting of the shaft S, the starting-mechanism for the spindle of the new roll is actuated by the intermeshing of the rack $p^5$ with the pinion $p^3$ and the mechanism in gear therewith, so that a turning motion is imparted to the spindle and the roll and the web of the new roll fed forward by the tapes at approximately the same speed therewith so that the coated end of the web is taken up by the tapes and the guide-roll $t^4$ and pasted or spliced on to the web of the spent roll. The starting-mechanism produces the forward feed of the web and prevents the holding back or lagging of the same, so as to secure in a positive manner the splicing of the new roll on to the web of the spent roll. As soon as the splicing is accomplished, the separating-blade is oscillated and the web of the spent roll cut off. Simultaneously therewith the blocks on the horizontal spindles are moved forward with the new roll and the blocks carrying the spent roll moved in upward direction, so that when the spent roll is lifted out of the way, the new roll arrives in the position before occupied by the spent roll and the web of the new roll fed to the press in the regular manner. The starting and forward motion of the new roll is controlled by the blocks B and by the guide and brake-rail until the brake-pulley on the spindle of the spent roll is released from the brake-shoes and the latter are applied to the brake-pulley of the new roll. When the new roll arrives in operative position, the pusher-rod on the block B engages the operating crank-arm of the crank-lever of the movable clutch-member $C^1$ and moves the same out of mesh with the clutch-member $C^2$, so that the motion transmitted to the shaft S is interrupted and the motion of the screw-spindles and blocks instantly arrested.

The advantages of my improved roll-renewing attachment for printing presses are that, simultaneously with the forward motion of the new roll and the moving out of the way of the spent roll, the splicing of the web of the new roll to the web of the spent roll and the cutting off of the web of the spent roll are accomplished in a reliable and effective manner by the tapes arranged at the lower part of the attachment and by the action of the oscillating cutting-blade without stopping the press; while simultaneously the forward motion of the new roll into operative position is accomplished in connection with the starting-mechanism applied to the spindle of the new roll and the guide and brake rail until the new roll arrives in operative position, when the brake-pulley on its spindle is engaged by the brake-mechanism, so that the new roll with its spindle can freely turn on the spindle for permitting its web to be fed to the printing press. The different operations are accomplished in a reliable manner and require only the manipulation of the hand-lever for starting the motion of the shaft S and the intermediate transmitting-mechanism after the end of the new web has been inserted by hand beneath the roller $t^4$, and the return of the locking-device for applying the brake-mechanism to the brake-pulley on the spindle of the new roll, the remaining operation of arresting the motion of the screw-spindles and blocks, starting the new roll, splicing the web of the new roll to the web of the spent roll, cutting off the web of the latter, and releasing the brake-shoes from the brake-pulley of the spent roll, being accomplished automatically by the mechanisms hereinbefore described.

Having thus described my invention, I claim as new and desire to secure by Letters Patent:

1. In a roll-renewing attachment for printing presses, the combination of a pair of horizontal screw-spindles, a pair of vertical screw-spindles, means for imparting simultaneously rotary motion to both sets of screw-spindles, blocks on the horizontal screw-spindles, the blocks being provided with upright bars for retaining the spindle of a new roll of paper, blocks on the vertical screw-spindles provided with brackets for receiving the spindle of the spent roll, a power-transmitting shaft, a double clutch-mechanism on said shaft, means for throwing it in mesh with the power-shaft, and means on one of the blocks of the vertical screw-spindles and on one of the blocks of the horizontal screw-spindles for automatically throwing said double clutch-mechanism out of mesh with the power-shaft and thereby arresting the motion of the same when the blocks arrive at either end of their motion.

2. In a roll-renewing attachment for printing presses, the combination of horizontal screw-spindles, a pair of vertical screw-spindles, blocks located on the horizontal screw-spindles and provided with vertical bars for engaging the spindle of the new roll, blocks on the vertical screw-spindles provided with brackets for receiving the spindle of the spent roll, a power-shaft, means for transmitting motion from said power-shaft to the horizontal and vertical screw-spindles, a double clutch-mechanism on the power-shaft consisting of a shiftable member and two rotary clutch-members, a crank-mechanism for shifting the movable clutch-member in engagement with either one of the rotary clutch-members, a hand-lever connected with said crank-mechanism, and means located, respectively, on one of the blocks of the vertical screw-spindles and on one of the blocks of the horizontal screw-spindles for automatically shifting the movable clutch-member out of mesh with the rotary clutch-member for interrupting the motion of the power-shaft and parts operated thereby.

3. In a roll-renewing attachment for printing presses, the combination, with the supporting side-frames, of horizontal screw-spindles, blocks on said screw-spindles, retaining-bars guided in said blocks and projecting above the side-frames, and roll-lifting levers fulcrumed to the upper corners of the side-frames and provided with end-lugs and hook-shaped projections for receiving the spindle of the new roll preparatory to lifting it into position on the ingoing ends of the side-frames.

4. In a roll-renewing attachment for printing presses, the combination, with a horizontal set of screw-spindles, a vertical set of screw-spindles, blocks on said horizontal screw-spindles, blocks on the vertical screw-spindles, means on the blocks of the horizontal screw-spindles for retaining the spindle of the new roll, brackets on the blocks of the vertical screw-spindles for engaging the spindle of the spent roll, a set of tapes extending to the impression-cylinder of the press, means for guiding and tensioning said tapes, a serrated cutting-blade, pivoted and spring-actuated fingers applied to the supporting-shaft of said cutting-blade, rods attached to the blocks of the vertical screw-spindles, said rods being provided with projecting pins for engaging the fingers and oscillating the cutting-blade at the proper time for cutting the web of the spent roll and returning the cutting blade into its former position.

5. In a roll-renewing attachment for printing presses, the combination of a pair of horizontal screw-spindles, blocks on said spindles, and bars for holding the spindle of the new roll, of a starting-mechanism connected with the spindle of the new roll for imparting rotary forward motion to the spindle and roll.

6. In a roll-renewing attachment for printing presses, the combination of a pair of horizontal screw-spindles, blocks on said spindles, and bars for holding the spindle of the new roll, of a starting-mechanism connected with the spindle of the new roll, said starting-mechanism consisting of a rack on one of the blocks of the horizontal screw-spindles, a brake-pulley on said spindle, a horizontal guide and brake-rail, supporting-standards for said guide and brake-rail, and transmitting gears between the rack and brake-pulley for turning the spindle and roll.

7. In a roll-renewing attachment for printing presses, the combination, with the spindle of the new roll, provided with a brake-pulley, of a starting-mechanism for said roll, and a guide and brake-rail for the brake-pulley of the spindle.

8. In a roll-renewing attachment for printing presses, the combination, with the spindle of the new roll, provided with a brake-pulley, of a mechanism for starting and moving said roll, a guide and brake-rail for the brake-pulley of the spindle, and hinged and oscillating standards for supporting said guide and brake-rail.

9. In a roll-renewing attachment for printing presses, the combination, with the spindle of the new roll, provided with a brake-pulley, of a starting-mechanism for said roll, a guide and brake-rail for the brake-pulley of the spindle, and means for shifting laterally the guide and brake-rail, brake-pulley and roll.

10. In a roll-renewing attachment for printing presses, the combination, with the side-frames, of the spindle of the new roll supported thereon, a brake-pulley on said spindle, a guide and brake-rail for said brake-pulley located at one side of and parallel with the side-frames, hinged standards for supporting said guide and brake-rail, and means for oscillating the guide and brake-rail for shifting the roll of paper laterally on the side-frames.

11. In a roll-renewing attachment for printing presses, the combination, with the spindle of the new roll of paper provided with a brake-pulley, a pair of horizontal screw-spindles, blocks on said spindles and retaining-bars in said blocks, of a starting-mechanism for the new roll and a brake-mechanism for engaging the brake-pulley on the spindle of the new roll.

12. In a roll-renewing attachment for printing presses, the combination, with the spindle of the new roll provided with a brake-pulley, of a laterally-oscillating guide and brake-rail, a starting mechanism for the new roll, a brake-mechanism applied to the brake-pulley of the new roll, and means for adjusting said brake-mechanism into alinement with the longitudinal axis of the guide and brake-rail and brake-pulley.

13. In a roll-renewing attachment for printing presses, the combination, with the side-frames, of the spindle of the new roll supported thereon, a brake-pulley on said spindle, a guide and brake-rail for said brake-pulley located sidewise of and parallel with said side-frames, hinged upright standards supporting said guide and brake-rail, a brake-mechanism in line with said brake-pulley and guide and brake-rail and connecting with the latter, and means for laterally adjusting the brake-mechanism, guide and brake-rail, brake-pulley and roll.

14. In a roll-renewing attachment for printing presses, the combination, with the spindle of the spent roll of paper, provided with a brake-pulley, of brake-shoes applied to said brake-pulley, brake-levers connected with said brake-shoes, a locking-mechanism located between the outer ends of said brake-levers, a crank-arm on the pivot shaft of the cutting blade, and a flexible connection between said crank-arm and the locking-mechanism of the brake-levers whereby the locking-mechanism is automatically released from the brake-levers for permitting the release of the brake-shoes from the brake-pulley of the spent roll.

15. In a roll-renewing attachment for printing presses, the combination, with the spindle of the spent roll, provided with a brake-pulley, and means for lifting said spindle, a brake-mechanism consisting of brake-shoes, brake-levers and a locking-mechanism for said brake-levers, the upper brake-shoe being provided with a curved arm or horn for lifting and holding the upper brake-shoe out of the way of the ascending brake-pulley until it has cleared the same.

16. In a roll-renewing attachment for printing presses, a support for a spindle for a roll of paper, along which support the spindle is adapted to travel, and means for positively turning said spindle to start its rotation along said support.

17. In a roll-renewing attachment for printing presses, a support for a spindle for a roll of paper, along which support the spindle is adapted to travel, means for positively turning said spindle to start its rotation along said support, and means for braking the rotation of said roll.

18. In a roll renewing attachment for printing presses, a support for a spindle for a roll of paper, along which support the spindle is adapted to travel, means for positively turning said spindle to start its rotation along said support, and means for braking the rotation of said roll at or near the end of its course.

In testimony whereof I have signed my name to this specification in the presence of two subscribing witnesses.

JAMES T. PETO.

Witnesses:
GORHAM CROSBY,
EDWIN SEGER.